Jan. 2, 1923. 1,440,363

J. ANDRADE.
COMBINATION OF SPRINGS.
FILED NOV. 25, 1919

2 SHEETS-SHEET 1

Inventor
Jules Andrade
By H. R. Kerslake
Atty.

Patented Jan. 2, 1923.

1,440,363

UNITED STATES PATENT OFFICE.

JULES ANDRADE, OF DOUBS, FRANCE.

COMBINATION OF SPRINGS.

Application filed November 25, 1919. Serial No. 340,532.

*To all whom it may concern:*

Be it known that I, JULES ANDRADE, a citizen of the French Republic, and residing at 5 Rue des Villas Bizontines, Besancon, Doubs, France, have invented certain new and useful Improvements in Combinations of Springs, of which the following is a specification.

This invention has for its object to provide an improved combination or group of at least four springs of spiral or helical shape, all having the same dimensions and being composed of the same material, arranged in symmetrically formed pairs, each having a fixed point of attachment to a non-oscillating body and also a point of attachment to an oscillating solid body. Although wanting in what is known in watchmaking as "curved ends" they are combined according to this invention with the oscillating solid body in such a manner as to exert upon the latter a pure couple; all transverse pressure or pressure parallel to the axis of oscillation being avoided. Further, the plane of the couple is not oblique, but is located at right angles to the axis of oscillation. For this purpose, these four springs, all unstressed in one and the same position of the oscillating solid body in which their geometrical axes coincide with the axis of oscillation are arranged in such a manner as to open and close at the same time. Moreover, the movable point of attachment of each of these springs is situated on the same line (passing through the axis) as the movable point of attachment of one of the two springs that are symmetrical to it as regards form, and on the same line (parallel to the axis) as the movable point of attachment of the other one of these two springs.

Two constructional examples of this invention are illustrated in the accompanying drawings.

Figure 1:
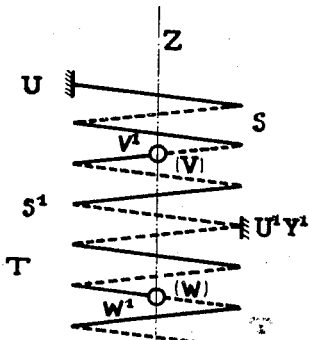
Figure 2:
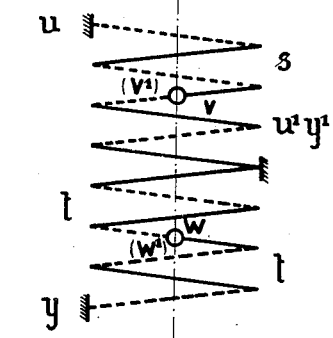
Figure 3:
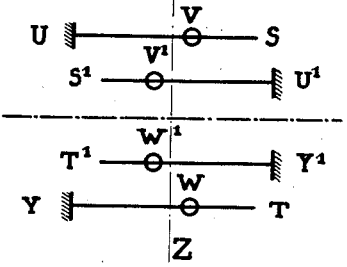
Figure 4:
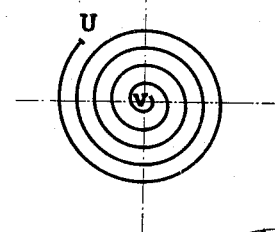
Figure 5:
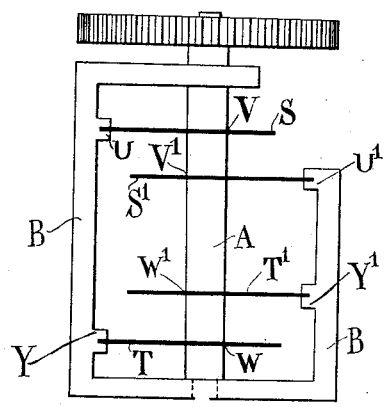

Fig. 1 shows a side view of a group of four helical springs, and Fig. 2 shows a similar group but oppositely coiled, the two groups of Fig. 1 and Fig. 2 forming together the first example of helical springs. Fig. 3 shows a side view of a group of four spiral springs forming the second example, and Fig. 4 is a plan view of Fig. 3. Fig. 5 shows by way of example, the application of a group of four spiral springs to a fixed body and to an oscillating solid body.

The first example is composed of eight helical springs, decomposable into two constructional groups each consisting of four springs S, $S^1$, T, $T^1$ (Fig. 1) and $s$, $s^1$, $t$, $t^1$, (Fig. 2) respectively. These eight springs are combined with a common oscillating solid body. The latter is represented solely by its axis Z—Z, in Figs. 1-3 and by the eight movable points of attachment V, $V^1$, W, $W^1$, $v$, $v^1$, $w$, $w^1$, which may be assumed to be connected by means of rigid arms to eight ferrules clamped upon a shaft of the oscillating solid body. U, $U^1$, Y, $Y^1$, $u$, $u^1$, $y$, $y^1$ are the fixed points of attachment to a non-oscillating body.

The second constructional example shown in Figure 3, is identical with one of the groups of four springs of the first example. In the said second example however the springs consist of flat spirals. These flat spirals are considered by all writers of treatises on watch and clock-making as belonging to the class of helical springs, and therefore all statements hereinafter made referring to springs of the first kind are applicable without more ado to these flat spiral springs whose various points of attachment are designated in the same manner as those of the helical springs.

In Fig. 5 is shown by way of example only the application of a group of four spiral springs S, S', and T, T' to a solid oscillating body A and a fixed body B. The oscillating body A is provided with a member D to which is imparted the oscillating motion. The springs S, S' are connected at U, U' to the fixed body and at V and V' to the oscillating body. Similarly the springs T and T' are connected at Y, Y' and W, W' to the fixed and the oscillating body respectively.

Reference being had first to the group S, $S^1$, T, $T^1$ (Figure 1 or 3): The springs S and $S^1$ are symmetrical in form, as are also T and $T^1$; S and $T^1$ can be superposed, as can also $S^1$ and T. On considering more particularly the spring S, and the two springs $S^1$ and T symmetrical to it, it will be noted that the point of attachment V is situated on the same line passing through the axis Z—Z at right angles thereto in the case of helical springs and obliquely thereto in the case of spiral springs as the point of attachment $V^1$, and on the same line (parallel to Z—Z) as the point of attachment W. On then comparing $S^1$ with S and $T^1$; then T with $T^1$ and S; and finally $T^1$ with T and $S^1$, analogous results will be found for $V^1$, $V$, $W^1$; $W$, $W^1$, $V$; and $W^1$, $W$, $V^1$ respectively. All four springs open at the same time when the solid body is oscillating from right to left.

If by reason of an oscillation of the solid body, the spring S exerts a pressure at the point V of the said body, this pressure will be directed along a straight line from V to U, either in the direction of U, or in the opposite direction. By symmetry, T will exert at W an equal pressure which is however directed along the straight line W Y. A similar pressure will be exerted at $W^1$ along the straight line $W^1$, $Y^1$; and at $V^1$ along the straight line $V^1$ $U^1$.

Each of these pressures can be resolved into three components, namely, a transverse component (that is to say, directed along a line intersecting Z—Z at right angles), a line parallel to Z—Z and a third line having a peripheral direction (that is to say, in the direction of the motion of the movable point of attachment or in the opposite direction thereof). It will be readily understood that the first components of the pressures at V and $V^1$ are equal in magnitude and opposite in direction and therefore neutralize one another, as are also the first components of the pressures at W and $W^1$; and that the second components of the pressures at V and W will balance one another, as will also the second components of the pressures at $V^1$ and $W^1$. The third components will constitute a couple whose plane is at right angles to Z—Z like the couple due to the fixing of the points of attachment.

The reasoning above given respecting the group S $S^1$ T $T^1$ applies also to the group $s$ $s^1$ $t$ $t^1$, except that the springs of the latter group close when the solid body is oscillating from right to left.

Since the springs $s$ $s^1$ $t$ $t^1$ are made of the same material and have the same dimensions as the springs S $S^1$ T $T^1$ but open when the latter close, there will be perfect symmetry as regards the effects of elasticity. To two equal angles of oscillation in opposite directions there will correspond two equal couples in opposite directions.

The hereinabove described combination of eight springs is applicable for example to chronometers and to precision spiral balance springs.

Having now particularly described and ascertained the nature of my said invention and in what manner the same is to be performed, I declare that what I claim is:—

1. A spring control device comprising in combination a body capable of oscillation about an axis, a non-oscillating body, and a group of four springs of the same material curvature and dimensions, all being unstressed in the stationary position and arranged to open and close at the same time having one end of each spring attached to the oscillating body and the other end of each spring attached to the non-oscillating body, the four springs being arranged in two symmetrically formed pairs, the two ends of the springs of each pair attached to the oscillating body being situated on a line passing through the axis of rotation and the ends of the springs attached to the oscillating body on the same side of the axis being situated on a line parallel to the axis of rotation for the purpose described.

2. A spring control device comprising in combination a body capable of oscillation about an axis, a non-oscillating body, and two groups composed of combined spring elements each group containing four helical springs of the same material curvature and dimensions being all unstressed in the stationary position and one end of each spring attached to the oscillating body and one end of each spring attached to the non-oscillating body, the springs of the one group opening when the springs of the other group close, the four springs of each group being arranged in two symmetrically formed pairs, the two ends of the spring of each pair attached to the oscillating body being situated on a line at right angles to the axis of rotation and the ends of the springs attached to the oscillating body on the same side of the axis being situated on a line parallel to the axis of rotation for the purpose described.

In testimony whereof I have signed my name to this specification.

JULES ANDRADE.